Figure 1:
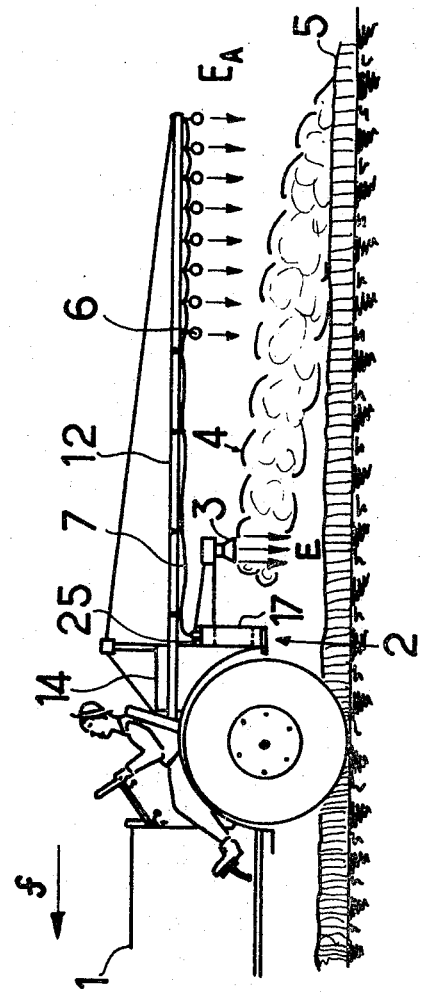

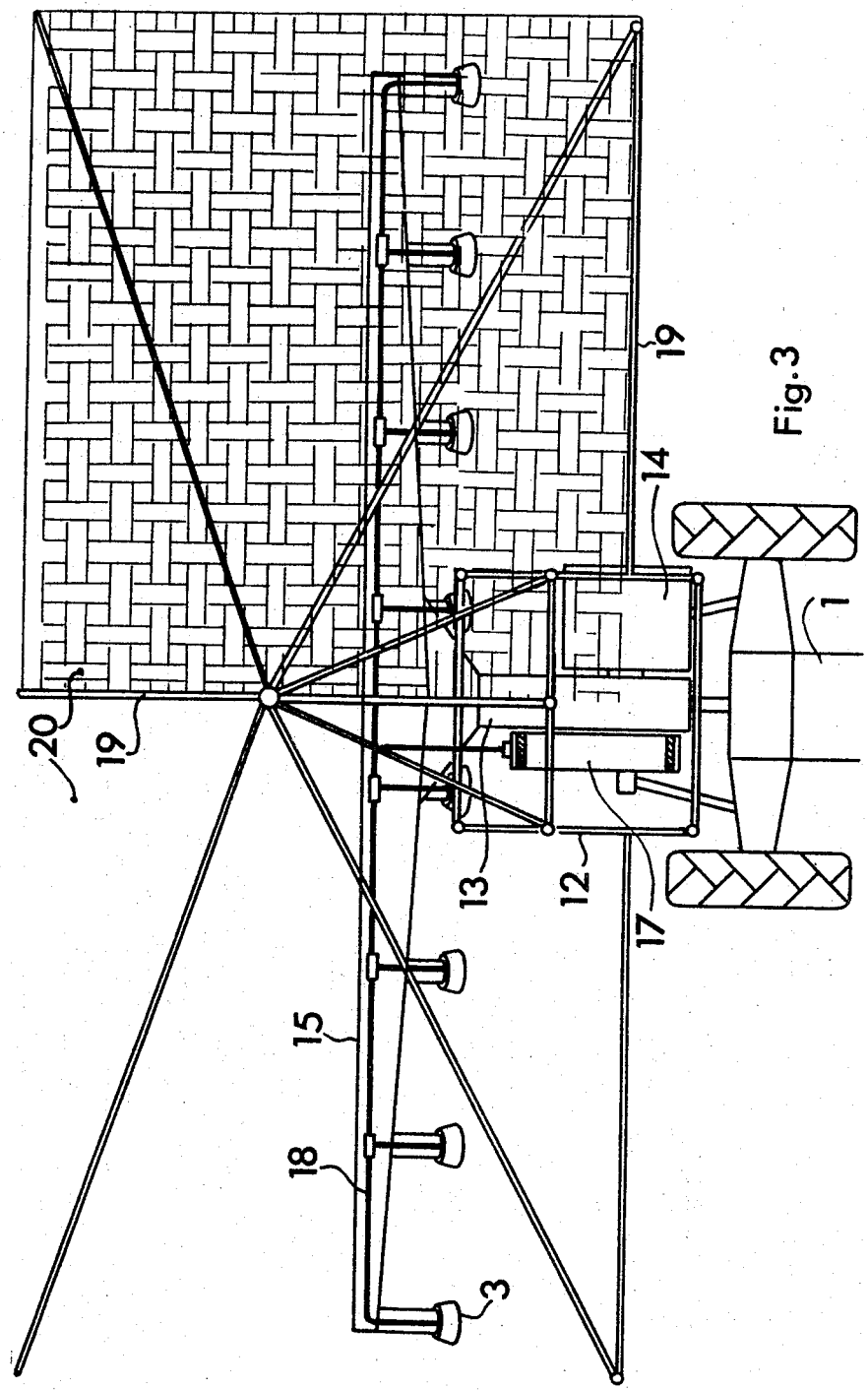

United States Patent Office 3,339,840
Patented Sept. 5, 1967

3,339,840
MOBILE ELECTROSTATIC SPRAYING SYSTEMS
Marcel Auguste Roger Point, Grenoble, France, assignor to Societe Anonyme de Machines Electrostatiques, Paris, France
Filed Mar. 10, 1965, Ser. No. 438,480
Claims priority, application France, Mar. 23, 1964, 4,666, Patent 1,401,990
16 Claims. (Cl. 239—3)

This invention relates to electrostatic spraying, dusting and sprinkling processes in which a treating substance in the form of finely divided, electrically charged particle, is discharged over target surfaces to be treated from a source that is in motion with respect to said surfaces.

In recent years electrostatic spraying methods have been suggested for use in agriculture for the treatment of farming crops and similar expanses of vegetation, with treating compositions possessing pesticidal or other beneficial properties. Such methods have considerably improved the effectiveness of the treatments in that the charged particles of treating agent are, to a substantial degree, positively conveyed on to the surfaces of the plant foliage over the lines of force of an electric field and thereafter cling to the foliage by electrostatic attraction.

Such treatments are conveniently carried out from a farming tractor or similar vehicle. The vehicle constitutes a mobile electrostatic spraying assembly which will generally include a store of the treating composition, an array of spray nozzles connected with the store for discharging the composition in particle form, usually with the assistance of a stream of compressed air, and a high-voltage electric generator producing a direct potential of the order of 100 or 200 kilovolts. Means, such as ionizing electrodes associated with the spray nozzles and electrically connected with the generator output, are provided for carrying the particles to a corresponding voltage as they are discharged into the atmosphere from the nozzles. The charged particles then tend to follow the lines of force of the electric field present between the nozzles and the vegetation—which of course is at ground potential—and settle over the plant surfaces and thereafter cling thereto due to electrostatic attraction.

Crop treatments performed by the above or equivalent methods are considerably more efficient than comparable treatments applied without the benefit of electricity. Because a larger proportion of the discharged treating agent actually finds its way to the foliage, losses of expensive treating agent are reduced. The efficiency of the treatment is also enhanced because the time of effective contact between the active agent and the plant foliage is prolonged, after the agent has settled over the leaf surfaces.

Experience has shown however, that the overall efficiency of such electrostatic crop spraying treatments is far from approaching the theoretical maximum values which may be expected, and that substantial losses are still incurred, especially in the presence of wind.

Objects of this invention are to reduce such losses and thus improve the efficiency of electrostatic spray treatments when performed from moving spray engines, such as farming tractors, aeroplanes, helicopters and other vehicles, and thereby to increase even further the benefits derivable from processes of this general class.

Careful observation and analysis of the detailed procedure by which the electrically charged particles of treating composition settle over the crops when discharged from a moving vehicle, have revealed to the applicant that the appreciable losses which still occur, especially in the presence of wind, are largely due to a single well-defined cause which is a direct consequence of the motion of the vehicle and the sprayer source. That is, the cloud of charged particles issuing from the spray nozzle or nozzles has not yet wholly settled over the vegetation when the carrier vehicle has already moved forward a substantial distance. The cloud of particles, while still afloat in the air, is thus continually removed from the action of the intense electric field present between the nozzles (and/or ionizing means associated therewith) and the ground, as the vehicle advances, and the particles are then only subjected to gravity plus the low residual field present between the floating cloud of particles and the ground. This field is very low, as is the gravity of the fine particles, so that a light wind is then sufficient to waft away the cloud of particles, resulting in the losses referred to above.

The basic concept of this invention, accordingly, lies in creating a strong auxiliary electric field moving forward with the vehicle and extending from a zone situated in front of the source, from which the charged particles are discharged (such as spray nozzles), to a substantial distance behind the said source, so that the auxiliary field will act on the floating cloud of particles for a substantial period of time after said cloud has been left afloat behind the advancing vehicle and therefore has escaped the action of the main field created by said source. The auxiliary field will thus greatly contribute to directing the particles towards and on to the crops, or other targets to be treated.

For this purpose the invention utilitizes electrically chargeable structure supported from the moving vehicle and extending a substantial distance beyond the source of particle discharge (such as nozzles) in the rearward direction, including means carrying the structure to an electric potential of similar sign to that to which the substance is carried as it issues from the source, so as to create the afore-mentioned auxiliary electrostatic field serving to prolong the directive action of the main field on the particles after the particles have issued from the source and the source has advanced so as to render said main field inoperant as far as those particles are concerned.

Due to this provision of the invention, the particles after they have been emitted remain subject to the influence of a directive field throughout all, or almost all, of the time required for them to settle over the target surfaces even though the vehicle is continually advancing. The directive action is thus greatly enhanced and the efficiency of the electrostatic spray treatment correspondingly increased and approaches the theoretical maximum that is to be expected from the electrostatic forces used.

Embodiments of the invention will now be described for purposes of illustration but not of limitation with reference to the accompanying drawings, wherein:

FIG. 1 is a simplified view in side elevation of a farming tractor equipped with apparatus according to an embodiment of the invention, in field operation;

FIG. 2 is a side elevational view showing in greater detail a modified form of embodiment of the invention; and FIG. 3 is a corresponding view in plan.

Shown in FIG. 1 is a conventional farming tractor 1 travelling over a field on which are growing crops 5 to be treated. The tractor 1 carries at its rear an electrostatic spray-treating assembly generally designated 2 which may be generally conventional. As here schematically shown, the electrostatic spray treating assembly includes a store 14 of treating composition which may be in liquid or powder form, and one or more spray nozzles such as 3. The spray nozzle 3 is connected to the store 14 through suitable means including a fan or pump, not shown, depending on the nature of the composition to be sprayed, so as to discharge the treating composition in a highly divided form and in a generally downward direction. The assembly 2 further includes a source of high-voltage low-current electric power, indicated at 17, and which may desirably comprise an electrostatic generator having an output terminal 25 delivering a high direct voltage, of say 150 kilovolts negative, the other terminal of the generator being grounded. The output terminal 25 is connected, through conducting means not shown, to conventional ionizing electrode means associated with, or forming part of, the spray nozzle 3 so as to carry all or most of the powder particles or liquid droplets of the composition to a corresponding potential as they issue out of the nozzle 3. The composition issues out of the spray nozzle in the form of a mist or cloud 4 of (e.g.) negatively charged particles. Since the nozzle 3, or the ionizing means, not shown, associated with it, is carried to a high potential relative to ground, a strong electrostatic field is created between the nozzle and the crops 5, the lines of force of this field being generally vertical as indicated at E, and the charged particles in the cloud 4 are conveyed along these lines of force and deposited on the crops.

The arrangement thus described constitutes a generally conventional electrostatic crop treating system, and the applicant's observations and tests have shown it to be open to the following deficiency.

The particles sprayed from the nozzles 3 are projected towards the crop essentially by the air current—at least in an initial phase—but quite a large proportion of the particles do not reach the crop immediately and instead just fall slowly, under the influence only of gravity and the charge due to the electrical charge of the particles. These latter influencing forces are not sufficient to direct the particles on to the crop, in view of the fineness of the said particles, which is an essential factor in their effectiveness.

Now, while the particles are thus slowly falling the tractor 1 is moving forward in the direction indicated by arrow $f$, at an appreciable speed. Consequently there will be a large number of particles that are still afloat in the atmosphere, while they are now positioned well behind the spray nozzles 3 owing to the forward motion of the tractor, and hence are removed from the influence of the electric field E present between the spray nozzles and ground. These floating particles are then subject only to a very low residual field created by the cloud itself, and to gravity, and are therefore very likely to be wafted off and stray under the influence of any breath of wind.

In accordance with the invention, this difficulty is overcome in the following way. Mounted on the tractor 1 through suitable insulating supporting means generally indicated at 12, is an electrically chargeable structure 6, extending generally in a horizontal plane somewhat above the level of spray nozzles 3 and extending rearward a substantial distance beyond the nozzles. The structure 6 may as shown comprise a generally flat array of tubular or rod electrodes or wires extending in a transverse direction and longitudinally spaced, the electrodes 6 being made of conductive material and being all electrically interconnected with one another and with the output terminal 25 of the generator 17 as by means of the insulated cable 7 extending along the support 12.

The array of electrodes 6 creates an auxiliary electrostatic field as indicated by the arrows $E_A$, which is in the same direction as the main field E, and has a considerable longitudinal extent rearwardly beyond said main field E, which as earlier indicated is produced beneath the spray nozzle 3 but does not extend substantially to the rear of said nozzle.

Owing to the presence of this rearward auxiliary or "extension" field $E_A$, the charged particles in the floating cloud 4 which have remained afloat in the atmosphere after they have escaped the directive influence of the main field E, are caught up by the auxiliary field $E_A$ and submit to the directive force created by it to force the particles downward and cause them to settle on the foliage of the crops 5. It will be readily understood that if the rearward extent of the chargeable structure 6 which creates this auxiliary field is made long enough, as measured rearwardly of the spray nozzle 3, the directive influence of the auxiliary field $E_A$ can be caused to extend, in time duration, sufficiently long to ensure that nearly all of the particles of treating agent in the cloud 4 have actually settled upon the plant surfaces, and cling firmly thereto by electrostatic attraction, at which time of course they are no longer in danger of being dissipated by wind, as they were while in their floating condition, but will adhere to the plants, enabling the active agent contained in the composition to exert its full action on the plant organism.

In the embodiment of the invention just described, the electrically chargeable structure 6 serving to create the auxiliary extension field of the invention, was made of conductive material and was connected by an electrical conductor 7 to the high-voltage terminal of the power source 17 serving to charge the particles. In accordance with an advantageous aspect of the invention, it has been found that substantially equivalent results can be obtained if the electrically chargeable structure of the invention is made of insulating material and its connection with the high voltage source omitted. Experience has shown that with such an arrangement, within a very short time after the electrostatic spraying operations have been commenced, the insulating structure positioned to the rear of the spray nozzle becomes intensely charged with electricity of the same sign as the discharged particles. Such charge is apparently acquired by the structure primarily through the action of the atmospheric ions which are generated by the nozzle 3 itself, the ionizing means associated with it and/or the charged particles of the cloud. It is found that the auxiliary field $E_A$ which is created beneath such an insulating structure, where such is used, is usually strong enough to provide the same advantageous results as the conductive structure described with reference to FIG. 1. This modification of the invention is clearly advantageous in that the apparatus is simplified, power consumption is reduced, and the possible inconveniences of a high-voltage connection are eliminated.

Figure 2:
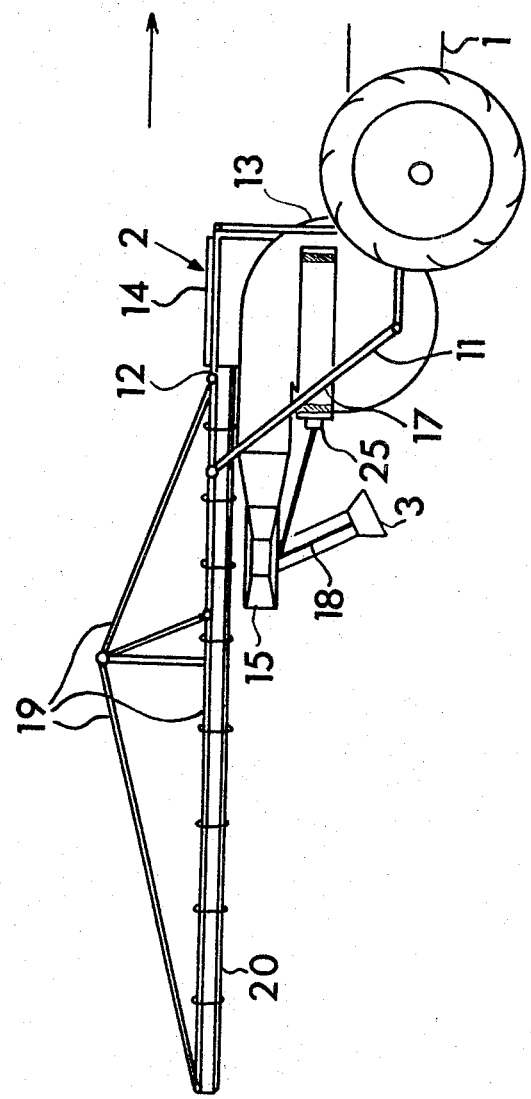

This last mentioned form of embodiment of the invention will now be described in greater detail with reference to FIGS. 2 and 3.

In these figures, parts corresponding to parts shown in FIG. 1 are designated by the same reference numerals even though the parts are shown somewhat less schematically than in that figure. A supporting frame 12 carried at the rear of the tractor 1 supports the electrostatic spray treating equipment 2, which includes the store 14 of treating composition, e.g. powder, a fan 13 and a high-voltage electrostatic generator 17. The fan 13, driven from an auxiliary motor not shown or a power takeoff of the tractor 1, is arranged to draw powder out of the store 14 and discharge the powder, suspended in an airstream, into a transversely extending conduit 15 having an array of spray nozzles such as 3 connected to space points along its length. In accordance with a preferred feature of the invention the spray nozzles 3 are directed at a forward angle from the vertical, in the direction of motion of the tractor 1. This orientation of the spray nozzles is found beneficial for reasons somewhat similar to what was explained in connection with the action of the auxiliary field of the invention, that is, it causes the floating cloud of emitted particles to remain subject to the directive action of the main field for a longer period than would be the case if the nozzles were directed vertically downward, or with greater reason at an angle rearward to the vertical. A convenient angle at which the nozzles 3 may be forwardly directed is about 30° from the vertical, though it is to be understood that other orientations of the spray nozzles 3 may be used, such as the vertical downward orientation shown in FIG. 1.

The electrostatic generator 17, which may be of the type disclosed in U.S. Patent 2,781,460, is driven from any convenient source of mechanical power and delivers a high voltage, say +150 or +200 kilovolts, at its output terminal 25, while its other terminal is grounded through the frame of the tractor. Terminal 25 is connected by insulated conductors such as 18 with the terminal portion of each of the sprayer nozzles 3 which may be constructed to provide ionizing means for the particles issuing from the nozzle, e.g. as disclosed in U.S. patent application Ser. No. 186,436.

In accordance with the present invention, the supporting frame 12 carries a system of metal stays and/or guy lines, generally designated 19, and which may conveniently be made of strong, lightweight tubing and is suitably triangulated to impart stiffness. Supported from frame 12 and braced by the stay structure 19 is a generally flat horizontal screen 20 positioned at a level somewhat above the conduit 15 and its lateral span is large enough to encompass said conduit with all of the sprayer nozzles 3 projecting from it, as shown in FIG. 3.

The screen 20 may be made from any suitable material having sufficient mechanical strength and imperviousness to weather the heavy-duty service conditions to which it is exposed, and having high electric resistivity. Preferably, the screen 20 is perforate, to reduce its vulnerability to wind. In the present example (see FIG. 3) the screen 20 is made of interwoven strips of sheet material, conveniently polyethylene stock from about 0.1 to 0.5 mm. thick, the strips being e.g. about 5 cm. wide and being interwoven to provide 5 cm. gaps between them. The strips may have their ends attached to marginal members of the tubular stay structure 19 in any suitable manner, such as adhesive resin. The screen 20 extends rearward a substantial distance beyond the spray nozzles 3, as shown.

The screen 20 may be course be constructed in other ways without exceeding the scope of the invention. Thus it may consist of one or more pieces of continuous sheeting, preferably perforate for the reason indicated. Suitable rigid board may also be used instead of flexible sheet. Means may be provided for facilitating the mounting and removal of the screen, as by constructing the screen in separate sections, and means for coiling and uncoiling the screen if made of flexible sheet material.

Regardless of the material and construction used, it will be readily understood that the dimensions of the screen 20 as well as its geometry and relative arrangement with respect to the spray nozzles, may vary depending on the average rate of advance contemplated for the treating vehicle, the density and granulometry of the treating product, and other factors. As a general proposition, it may be stated that the electrically chargeable surface or screen of the invention should extend rearwardly beyond the spray nozzles a distance at least corresponding to the distance travelled by the vehicle in about one second. It would usually be unpractical, and superfluous as well, for said surface or screen to have a rearward extent substantially greater than the distance covered by the vehicle in about three seconds. With a screen having a rearward extent substantially in the range just indicated, it is found that the auxiliary field of the invention lasts a time sufficient to exert its directive action on the falling particles until they have reached, or very nearly reached, the plant surfaces.

*Example*

Apparatus according to the invention was used to spray tobacco crops with a fungicide powder composition having an apparent density of about 1 and an approximate fineness of 10 to 30 microns average diameter of the powder particles. The electrostatic spraying assembly used four spray nozzles, each nozzle discharging the composition at a rate of about 2 grams solid powder and 100 litres atmospheric air per second. The ionizing surfaces of the nozzle were connected with the −150 kilovolt potential provided at the output terminal of an electrostatic generator, and the resulting current flow from the nozzles, in the form of charged particles of the powder composition and atmospheric ions, was 0.2 milliamp per nozzle. The nozzles were directed at an angle of 30° forwardly from the vertical, and the nozzle outlets were positioned between 30 to 50 cm. above the tobacco plants.

As the electrically chargeable screen structure, there was used thin gauge polyethylene sheet, 4 metres in width and 3 metres in length, mounted horizontally at a height of about 20 cm. above the nozzles, and its projecting length rearward of the nozzle outlets was about 2 metres.

The tractor was driven at a speed of about 3.5 kilometres per hour, or nearly 1 metre per second.

It was found that the polyethylene screen had been charged to a high negative voltage.

Visual observation showed that the cloud of powder particles formed below and behind the nozzles had a more stable aspect and settled more rapidly over the crops than when the screen was not used.

It will be understood that various changes and modifications may be made in the apparatus of the invention in addition to those specifically referred to herein, without exceeding the scope of the claims. For example, the spray nozzles may be made to project downwards through perforations in the electrically chargeable structure or screen of the invention. Said screen or structure may be positioned in a vertical longitudinal plane rather than horizontally as here shown, for example in the spray treatment of trees.

The invention is applicable with vehicles other than farming tractors, including aircraft. The electrically chargeable structure may then constitute at least in part a portion of the body of the aircraft. The invention moreover is not restricted to agriculture but may be applied to industrial electrostatic precipitation processes in which a large array of articles are to be coated or painted from a mobile electrostatic spraying station moving with respect thereto.

It should be understood that in the ensuing claims the word "spray" and its derivatives, where they occur, are to be interpreted broadly as applying to liquid treating materials, paste or pulp-like materials, and solid powder materials. In this last sense the word "spraying" as here used should be taken as including "dusting."

What is claimed is:

1. Electrostatic spraying apparatus comprising in combination a movable spraying station adapted for continuous motion in relation to target surfaces to be sprayed, means at said station for emitting a cloud of finely divided spray material with a velocity component rearward of the direction of motion of the station so low that the material tends to hang as a substantially stationary floating cloud as the station moves on, means for carrying said material to a high electric potential relative to said target surfaces, and structure supported from and movable bodily with the station and defining an electrically chargeable surface extending a substantial distance rearward beyond said cloud-emitting means in a position to remain spaced from said target surfaces as the station moves in relation thereto, including means for charging said chargeable surface to a high potential similar in sign to that of said first potential with respect to the target surfaces during emission of said cloud.

2. The apparatus defined in claim 1, wherein said surface extends forward as well as rearward from the cloud-emitting means.

3. The apparatus defined in claim 1, wherein said chargeable surface comprises electrically conductive material and there are means electrically connecting said surface with said high potential.

4. The apparatus defined in claim 3, wherein said structure comprises an array of spaced metallic electrode elements insulated from said station and electrically connected with said high potential.

5. Electrostatic spray treating apparatus comprising in combination a vehicle, a store of divisible treating material on the vehicle, spray nozzle means projecting in a generally downward direction from the vehicle and means connected with said store and nozzle means to emit a cloud of said material in divided form from said nozzle means with a velocity component rearward of the direction of motion of the station so low that the material tends to hang as a substantially stationary, floating cloud as the vehicle moves on, an electric generator on the vehicle having a high-voltage output terminal and a grounded terminal, ionizing means connected with said output terminal and positioned to carry said divided material to a high voltage relative to ground as the material is emitted, an electrostatic field being created between said nozzle means and ground for directing said cloud groundward, supporting structure carried by the vehicle rearwardly thereof and movable bodily with the vehicle, and a generally flat member supported from said structure, said member having a lateral extent not less than that of the cloud as emitted by said nozzle means and having a substantial longitudinal extent rearward beyond said nozzle means, said member being supported at a general elevation above the ground somewhat higher than that of said nozzle means, and said members being electrostatically charged during emission of said cloud to a high voltage of similar sign to that of said first voltage so as to create an auxiliary electrostatic field contributing to direct said cloud of material groundward as the cloud is left behind in a floating condition by the advancing vehicle.

6. Electrostatic spraying apparatus comprising in combination:
   a movable spraying station adapted for continuous motion in relation to target surfaces to be sprayed;
   means at said station for emitting a cloud of finely divided spray material;
   means for carrying said material to a high electric potential relative to said target surfaces; and
   structure supported from the station and defining an electrically chargeable surface of insulating material extending a substantial distance rearward beyond said cloud-emitting means in a position to remain spaced from said target surfaces as the station moves in relation thereto, and adapted to be charged to a high electric potential with respect to said target surfaces during emission of said cloud.

7. The apparatus defined in claim 6, wherein the longitudinal extent of said member rearward beyond said nozzle means is not substantially less than once and not substantially more than three times the distance travelled by said vehicle in about one second during a spray treating operation.

8. The apparatus defined in claim 6, wherein said nozzle means are directed in a downward direction at a forward angle to the vertical.

9. The apparatus defined in claim 6, wherein said surface extends forward as well as rearward from the cloud-emitting means.

10. The apparatus defined in claim 6, wherein said chargeable surface is supported in a generally horizontal position at an elevation somewhat higher than that of the point of emission of said spray material.

11. The apparatus defined in claim 6, wherein said chargeable surface comprises insulating plastic sheet material.

12. The apparatus defined in claim 11, wherein said sheet material is perforate.

13. The method of spray treating target surfaces from a continuously moving station, which comprises emitting from the station a cloud of divided treating material in a general direction towards the target surfaces with a velocity component rearward of the direction of motion of the station so low that the material tends to hang as a substantially stationary floating cloud as the station advances, carrying said material to a high electric potential with respect to said surfaces as the material emitted, and creating an auxiliary electrostatic field between an electrically chargeable surface of insulating material and said target surfaces which is movable with said station and extends rearward of the point of cloud emission, said field having a lateral extent at least as great as that of said cloud at the point of emission and the field vector being in such a direction as to contribute to directing said material towards said target surfaces as the cloud of material is left afloat behind the advancing station.

14. The method of claim 13, wherein said cloud is emitted in a direction at a forward angle in terms of the motion of the station.

15. The method of claim 13, wherein said auxiliary field extends rearward beyond the point of cloud emission a distance not substantially less than once and not substantially more than three times the distance travelled by said station in one second during the spray treating operation.

16. The method of claim 13, wherein said target surfaces are the leaf surfaces of growing crops.

References Cited
UNITED STATES PATENTS

| | | | |
|---|---|---|---|
| 2,477,947 | 8/1949 | Yadoff | 239—15 X |
| 2,658,009 | 11/1953 | Ransburg | 117—93.44 |
| 2,729,191 | 1/1956 | Ransburg | 117—93.44 X |
| 2,773,472 | 12/1956 | Lamm | 118—624 |
| 3,000,752 | 9/1961 | Jackson et al. | 117—17 |
| 3,212,211 | 10/1965 | Bennett | 43—148 |

M. HENSON WOOD, JR., *Primary Examiner.*

V. M. WIGMAN, *Assistant Examiner.*